United States Patent
Chien et al.

(10) Patent No.: US 12,211,238 B2
(45) Date of Patent: Jan. 28, 2025

(54) METHOD FOR RECONSTRUCTING AN IMAGE BY COMPARING IMAGES, IMAGE RECONSTRUCTION DEVICE EMPLOYING METHOD, AND NON-TRANSITORY STORAGE MEDIUM

(71) Applicant: HON HAI PRECISION INDUSTRY CO., LTD., New Taipei (TW)

(72) Inventors: Yu-Hsuan Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 419 days.

(21) Appl. No.: 17/857,265

(22) Filed: Jul. 5, 2022

(65) Prior Publication Data

US 2023/0326084 A1 Oct. 12, 2023

(30) Foreign Application Priority Data

Apr. 12, 2022 (CN) .......................... 202210379497.7

(51) Int. Cl.
*G06T 7/00* (2017.01)
*G06T 7/13* (2017.01)
*G06T 7/174* (2017.01)
*G06T 7/50* (2017.01)

(52) U.S. Cl.
CPC .................. *G06T 7/97* (2017.01); *G06T 7/13* (2017.01); *G06T 7/174* (2017.01); *G06T 7/50* (2017.01); *G06T 2207/20081* (2013.01)

(58) Field of Classification Search
CPC .... G06T 7/97; G06T 7/50; G06T 7/13; G06T 7/174; G06T 2207/20081
See application file for complete search history.

(56) References Cited

U.S. PATENT DOCUMENTS

| | | | |
|---|---|---|---|
| 10,657,647 B1* | 5/2020 | Chen | G06T 7/254 |
| 2002/0057838 A1* | 5/2002 | Steger | G06V 10/7515 |
| | | | 382/197 |
| 2015/0003741 A1* | 1/2015 | Zhang | G06V 10/98 |
| | | | 382/199 |
| 2020/0360109 A1* | 11/2020 | Gao | A61B 34/10 |
| 2023/0147722 A1* | 5/2023 | Ramirez de Chanlatte | |
| | | | G06N 3/0442 |
| | | | 345/419 |

FOREIGN PATENT DOCUMENTS

| | | |
|---|---|---|
| CN | 112270688 | 1/2021 |
| TW | I331728 | 10/2010 |

* cited by examiner

*Primary Examiner* — David F Dunphy
(74) *Attorney, Agent, or Firm* — ScienBiziP, P.C.

(57) ABSTRACT

A method for improving the reconstruction of images obtains an object image and a reference image and extracts a first edge of the object image and a second edge of the reference image based on a predetermined algorithm. A first vector of the plurality of first pixels to the first edge and a second vector of the plurality of second pixels to the second edge are obtained and a determination made as to whether the first vector and the second vector are consistent. A loss between the first vector and the second vector is calculated if the first and second vector are not consistent and a predetermined model is corrected based on the loss, the reference image being reconstructed into the object image based on corrected predetermined model. An image reconstruction device and a non-transitory storage medium are also disclosed.

15 Claims, 7 Drawing Sheets

METHOD FOR RECONSTRUCTING AN IMAGE BY COMPARING IMAGES, IMAGE RECONSTRUCTION DEVICE EMPLOYING METHOD, AND NON-TRANSITORY STORAGE MEDIUM

TECHNICAL FIELD

The subject matter herein generally relates to image processing.

BACKGROUND

In the current image reconstruction technology, a reference image can be reconstructed into an object image. When the reference image comprises a low-texture area, the low-texture area comprises few pixels, it is very difficult to determine whether pixels extracted from the reference image are the correct pixels, and an accuracy of determination is low, and the reconstructed object image will have poor quality as a result.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

It should be noted that references to "an" "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 1:
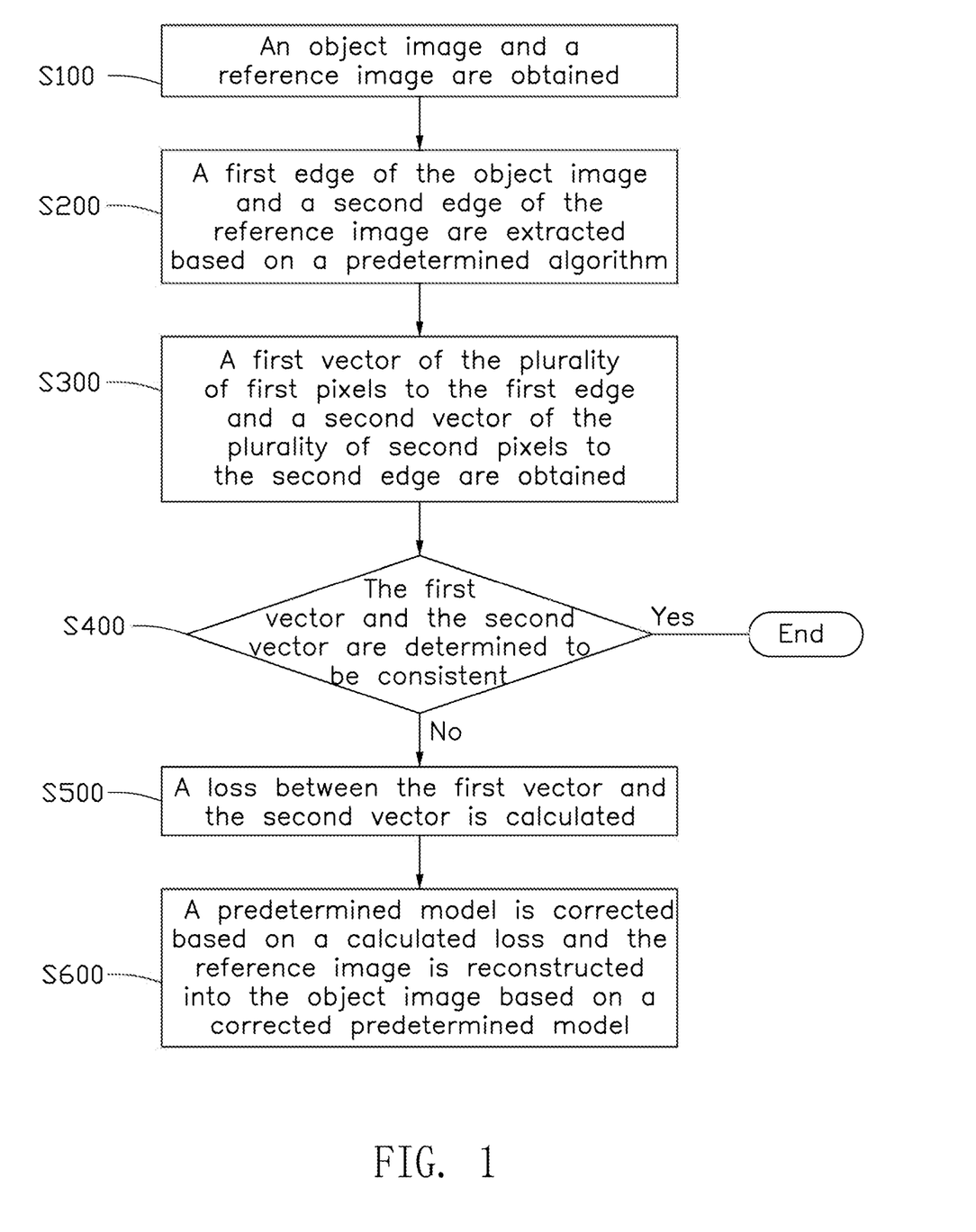
FIG. 1 is a flowchart of an embodiment of a method for reconstructing an image according to the present disclosure.

FIG. 1 illustrates one exemplary embodiment of a method for reconstructing an image. The flowchart presents an exemplary embodiment of the method. The exemplary method is provided by way of example, as there are a variety of ways to carry out the method. Each block shown in FIG. 1 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block S100.

In block S100, an object image and a reference image are obtained.

In one embodiment, the object image and the reference image can be two images taken by a camera at different times, or two images taken by two cameras from different viewpoints at the same time.

Figure 2A:
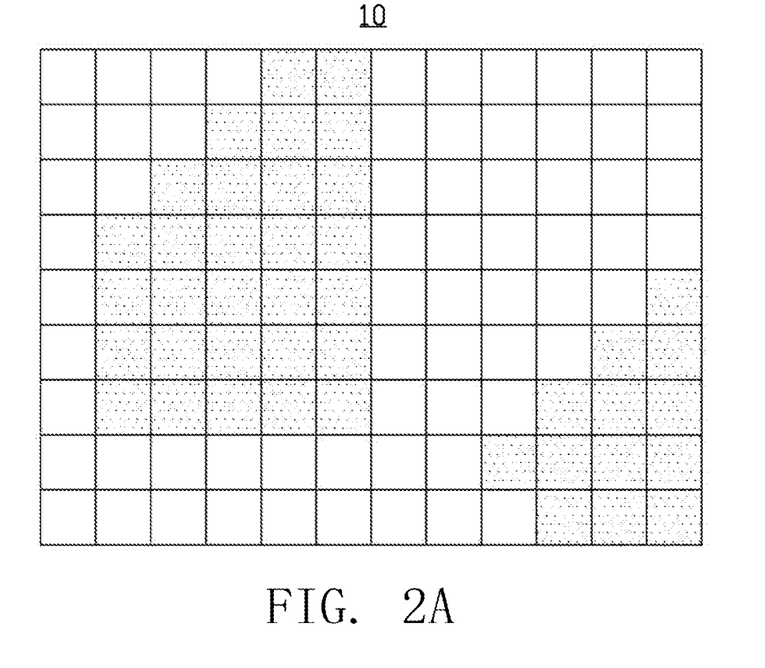
FIG. 2A is a diagram of an embodiment of an object image according to the present disclosure.
Figure 2B:
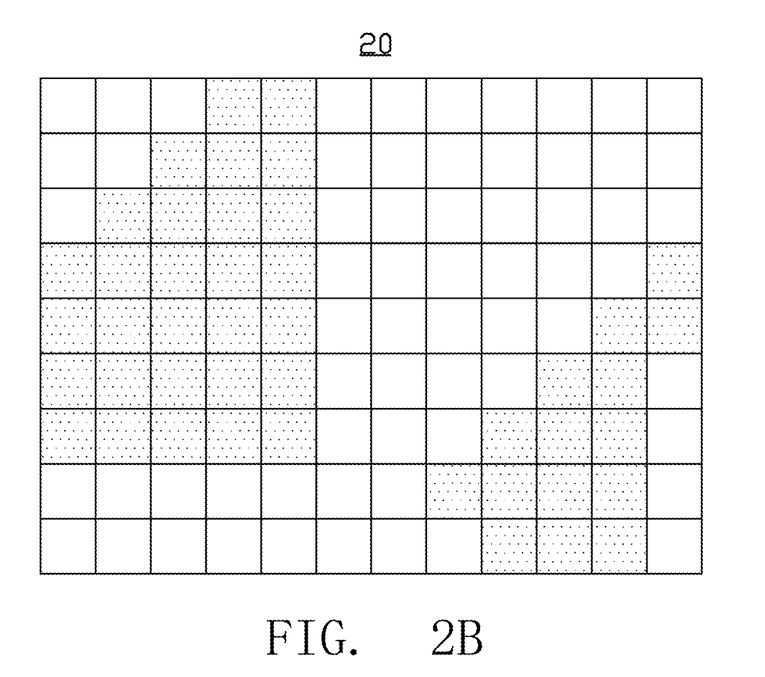
FIG. 2B is a diagram of an embodiment of a reference image according to the present disclosure.

In one embodiment, the object image 10 is shown as FIG. 2A, and the reference image 20 is shown as FIG. 2B.

In block S200, a first edge of the object image and a second edge of the reference image are extracted based on a predetermined algorithm.

In one embodiment, with regards to an image, the background of the image is an open area, and the method focuses on low-texture characteristics. An area in a connected domain of the image can be regarded as a low texture area. A better result can be obtained by enhancing a consistency of pixels in different scales.

Figure 3A:
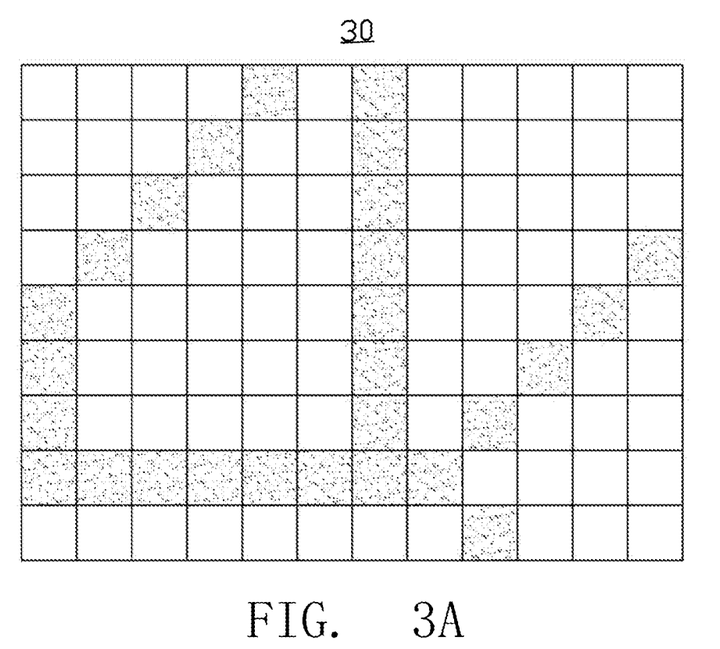
FIG. 3A is a diagram of an embodiment of a first edge of the object image of FIG. 2A.
Figure 3B:
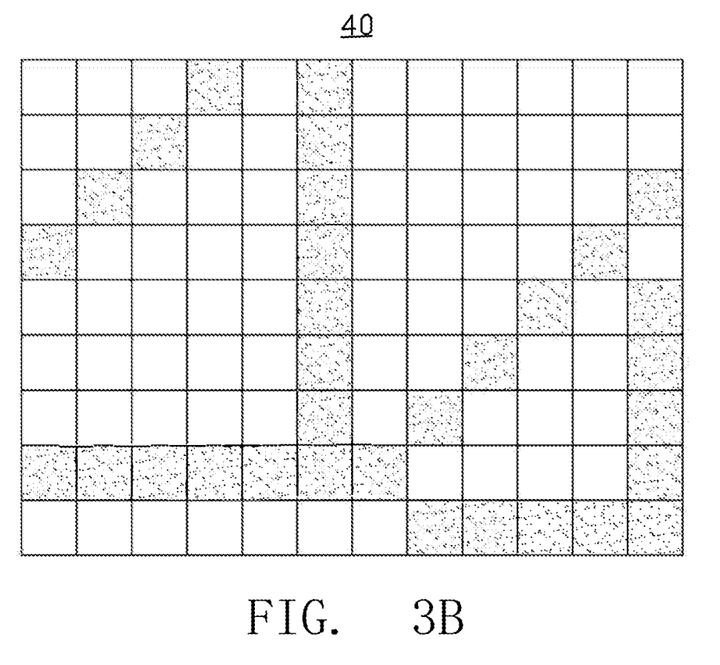
FIG. 3B is a diagram of an embodiment of a second edge of the reference image of FIG. 2B.

In one embodiment, an area within the first edge 30 is a low-texture area of the object image 10 as shown in FIG. 3A, and an area within the second edge 40 is a low-texture area of the reference image 20 as shown in FIG. 3B.

In one embodiment, the first edge of the object image 10 and the second edge of the reference image 20 can be extracted based on a predetermined algorithm. The predetermined algorithm can be a Sobel algorithm or a Canny algorithm.

In one embodiment, the Canny algorithm may comprise the following steps: firstly, applying Gaussian filtering to smooth an image to remove noise of the image; secondly, obtaining intensity gradient of the image and applying a non-maximum suppression technology to eliminate edge detections which are false; thirdly, applying a dual threshold algorithm to detect possible edges or potential edges; lastly, applying a hysteresis technique to track edges.

In one embodiment, the Sobel algorithm detects edges of an image based on weighted differences of grayscale values of adjacent pixels in four regions, the upper, the lower, the left, and the right of each pixel, and reaching an extreme value at an edge region, this has a smoothing effect on noise and provides accurate information as to an edge. The Sobel algorithm can comprise two sets of 3×3 matrices, which are horizontal and vertical, and consolidate them with image to obtain a approximation value of brightness differences of the horizontal and a approximation value of brightness differences of the vertical. For example, A represents an original image, $G_x$ represents an image grayscale value of horizontal edge detected, $G_y$ represents an image grayscale value of vertical edge detected, the formulas of $G_x$ and $G_y$ can be:

$$G_x = \begin{vmatrix} -1 & 0 & +1 \\ -2 & 0 & +2 \\ -1 & 0 & +1 \end{vmatrix} \cdot A; \; G_y = \begin{vmatrix} +1 & +2 & +1 \\ 0 & 0 & 0 \\ -1 & -2 & -1 \end{vmatrix} \cdot A.$$

In one embodiment, a gradient G of a pixel can be calculated by the following formula:

$$G = \sqrt{G_x^2 + G_y^2}.$$

a gradient direction θ of the pixel can be calculated by the following formula:

$$\theta = \tan^{-1}\left(\frac{G_x}{G_y}\right).$$

If θ is equal to zero, the image can be determined to comprise a vertical edge at that pixel, a left side being darker than a right side of the vertical edge.

In block S300, a first vector of the plurality of first pixels to the first edge and a second vector of the plurality of second pixels to the second edge are obtained.

Figure 4A:
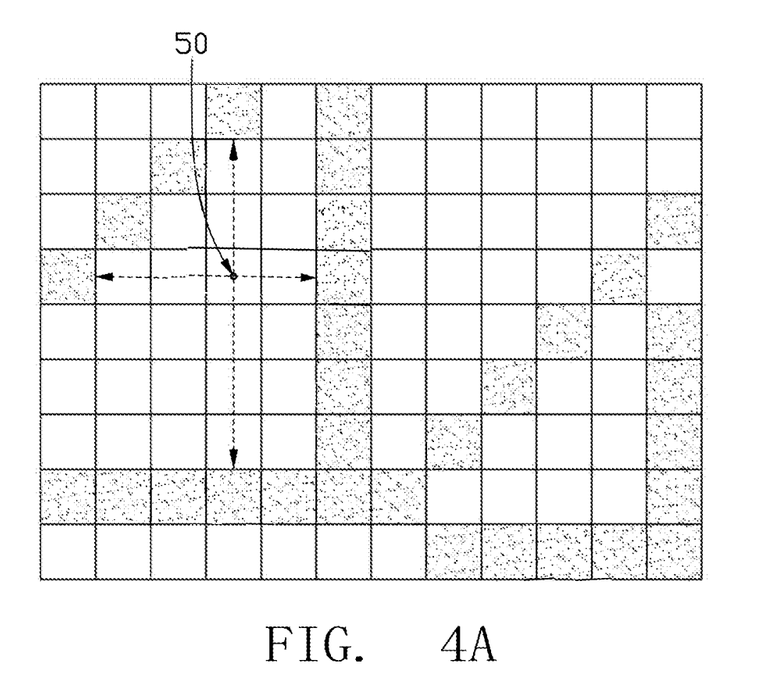
FIG. 4A is a diagram of an embodiment of first pixels of the object image of FIG. 2A.
Figure 4B:
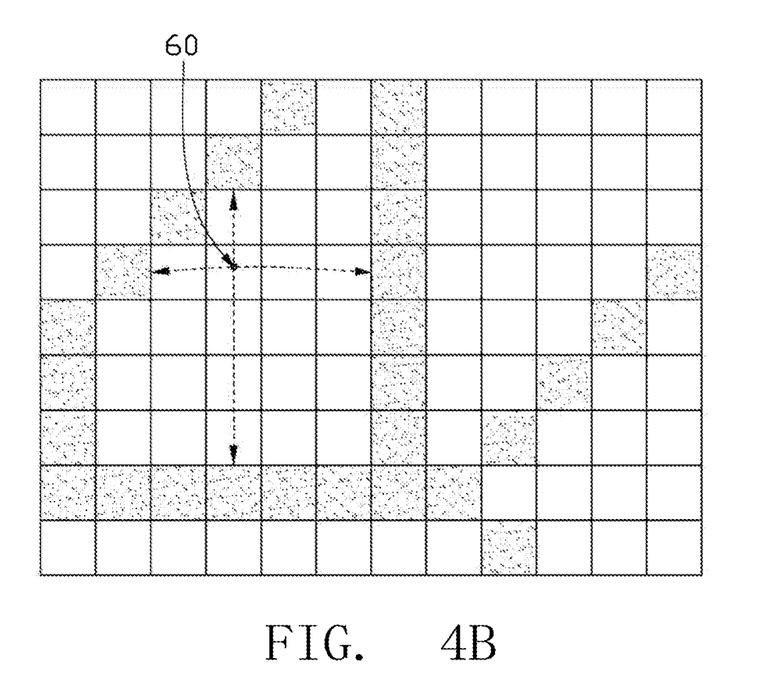
FIG. 4B is a diagram of an embodiment of second pixels of the reference image of FIG. 2B.

In one embodiment, the object image 10 can comprise multiple first pixels 50 as shown in FIG. 4A, and the reference image 20 can comprise multiple second pixels 60 as shown in FIG. 4B. The first vector P1 can be represented by: (up, down, left, right) 2, 3, 2, 1, and the second vector P2 can be represented by: (up, down, left, right) 1, 3, 1, 2.

In block S400, the first vector and the second vector are determined to be consistent.

In one embodiment, if the first vector P1 and the second vector P2 are consistent, the second pixels 60 are determined to be correct pixels. The first pixels 50 can be determined as accurate for reconstruction purposes, and the image comparison process can be ended.

In one embodiment, the first vector P1 is (2, 3, 2, 1), the second vector P2 is (1, 3, 1, 2), the first vector P1 and the second vector P2 are not consistent, and block S500 is performed.

In block S500, if the first vector and the second vector are not consistent, a loss between the first vector and the second vector is calculated.

In one embodiment, the loss between the first vector P1 and the second vector P2 can be calculated based on a predetermined formula. The predetermined formula can be:

$$\sum_{n=0}^{N} |v_{target} - v_{reference}|.$$

Therein, $V_{target}$ represents the first vector P1, $V_{reference}$ represents the second vector P2, and N represents the number of the second pixels 60. The number of the first pixels 50 can be equal to the number of the second pixels 60.

In block S600, a predetermined model is corrected based on a calculated loss and the reference image is reconstructed into the object image based on a corrected predetermined model.

In one embodiment, when the loss of the first vector P1 and the second vector P2 are calculated, the predetermined model can be updated based on the losses, an image reconstruction accuracy of the predetermined model can be improved. The object image 10 can be inputted into the updated predetermined model, depth information of the object image 10 can be obtained by the updated predetermined model, and the reference image 20 can be reconstructed into the object image 10 based on the depth information of the object image 10.

In one embodiment, a vector of each pixel to edge of image is unique, the method can determine whether pixels extracted from reference image are correct pixels based on a vector comparison, and accuracies of image comparison and image reconstruction can be improved.

Figure 5:
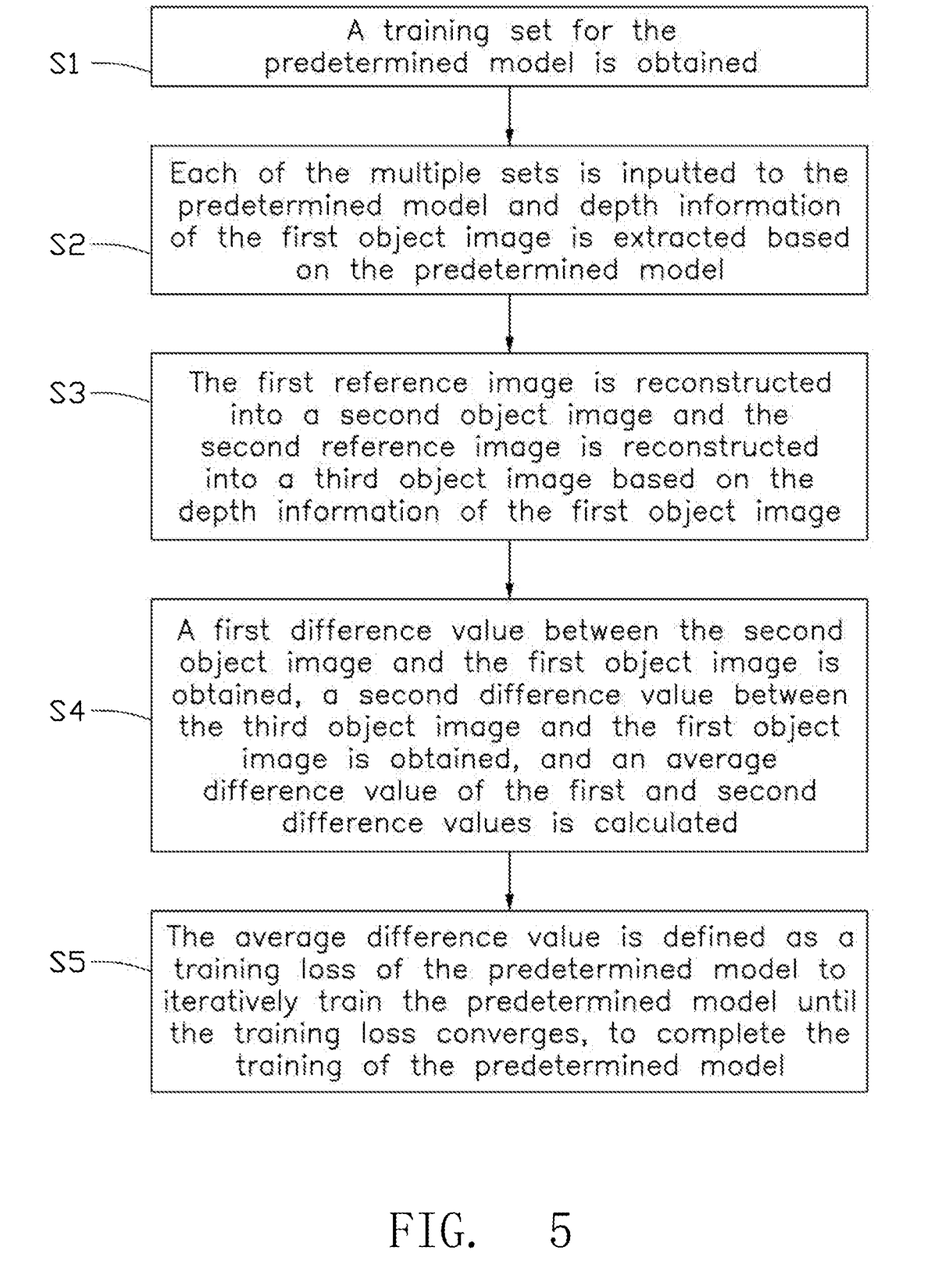
FIG. 5 is a flowchart of an embodiment of a method of training a predetermined model according to the present disclosure.

In one embodiment, a method for training the predetermined model can comprise blocks S1~S5.

In block S1, a training set for the predetermined model is obtained.

In one embodiment, the training set can comprise multiple sets of training data. Each of the multiple sets can comprise three sample images, the three sample images can comprise a first object image, a first reference image, and a second reference image.

In one embodiment, the three sample images can be arranged in order, and the first object image is the middle image of the three sample images.

In block S2, each of the multiple sets is inputted to the predetermined model and depth information of the first object image is extracted based on the predetermined model.

In block S3, the first reference image is reconstructed into a second object image and the second reference image is reconstructed into a third object image based on the depth information of the first object image.

In block S4, a first difference value between the second object image and the first object image is obtained, a second difference value between the third object image and the first object image is obtained, and an average difference value of the first and second difference values is calculated.

In block S5, the average difference value is defined as a training loss of the predetermined model to iteratively train the predetermined model until the training loss converges, to complete the training of the predetermined model.

In one embodiment, the number of training iterations of the predetermined model to loss convergence is about 100 epoches.

Figure 6:
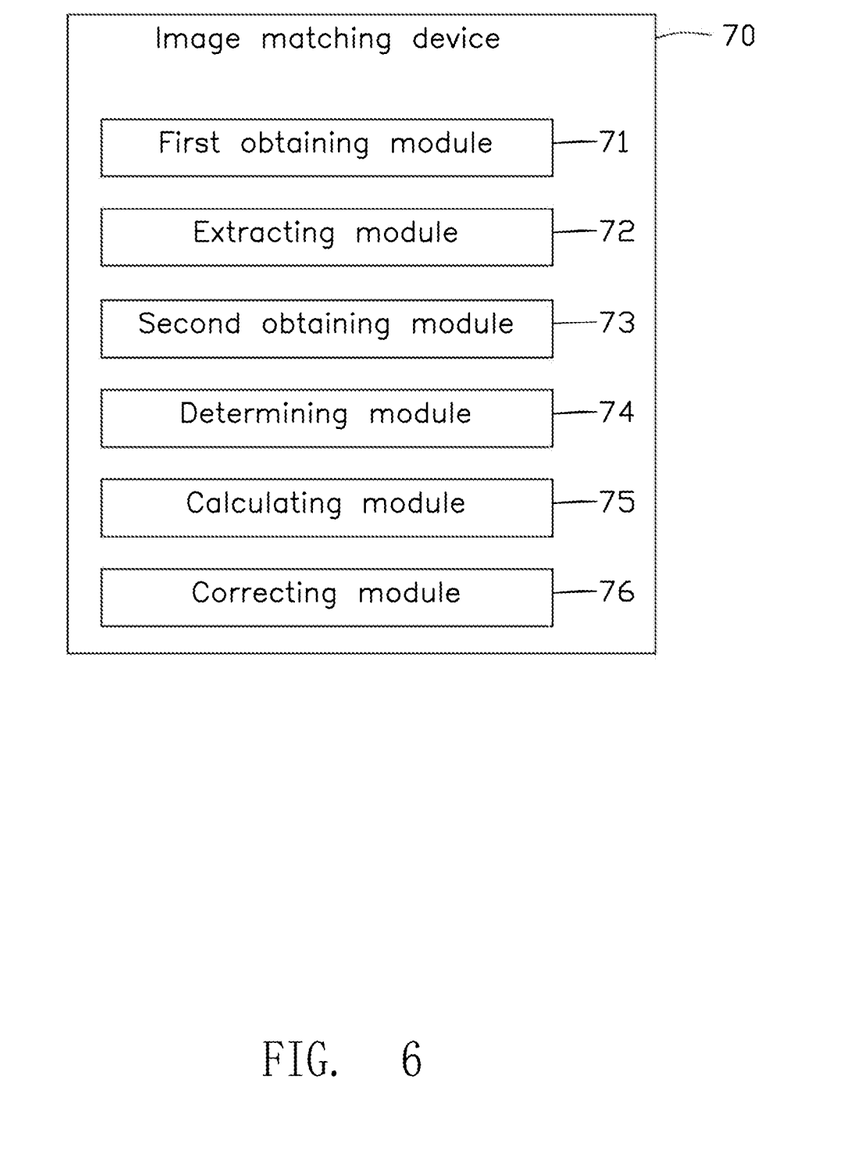
FIG. 6 is a diagram of an embodiment of an image matching device according to the present disclosure.

FIG. 6 illustrates one exemplary embodiment of an image matching device for reconstructing an image.

In one embodiment, the image matching device 70 can comprise a first obtaining module 71, a extracting module 72, a second obtaining module 73, a determining module 74, a calculating module 75, and a correcting module 76.

The first obtaining module 71 is configured to obtain an object image 10 and a reference image 20. The object image 10 comprises a plurality of first pixels 50, and the reference image 20 comprises a plurality of second pixels 60. The extracting module 72 is configured to extract a first edge 30 of the object image 10 and a second edge 40 of the reference image 20 based on a predetermined algorithm.

The second obtaining module 73 is configured to obtain a first vector P1 of the plurality of first pixels 50 to the first edge 30 and a second vector P2 of the plurality of second pixels 60 to the second edge 40. The determining module 74 is configured to determine whether the first vector P1 and the second vector P2 are consistent. If the first vector P1 and the second vector P2 are not consistent, the calculating module 75 is configured to calculate a loss between the first vector P1 and the second vector P2. The correcting module 76 is configured to correct a predetermined model based on the loss and reconstruct the reference image 20 into the object image 10 based on corrected predetermined model.

Figure 7:
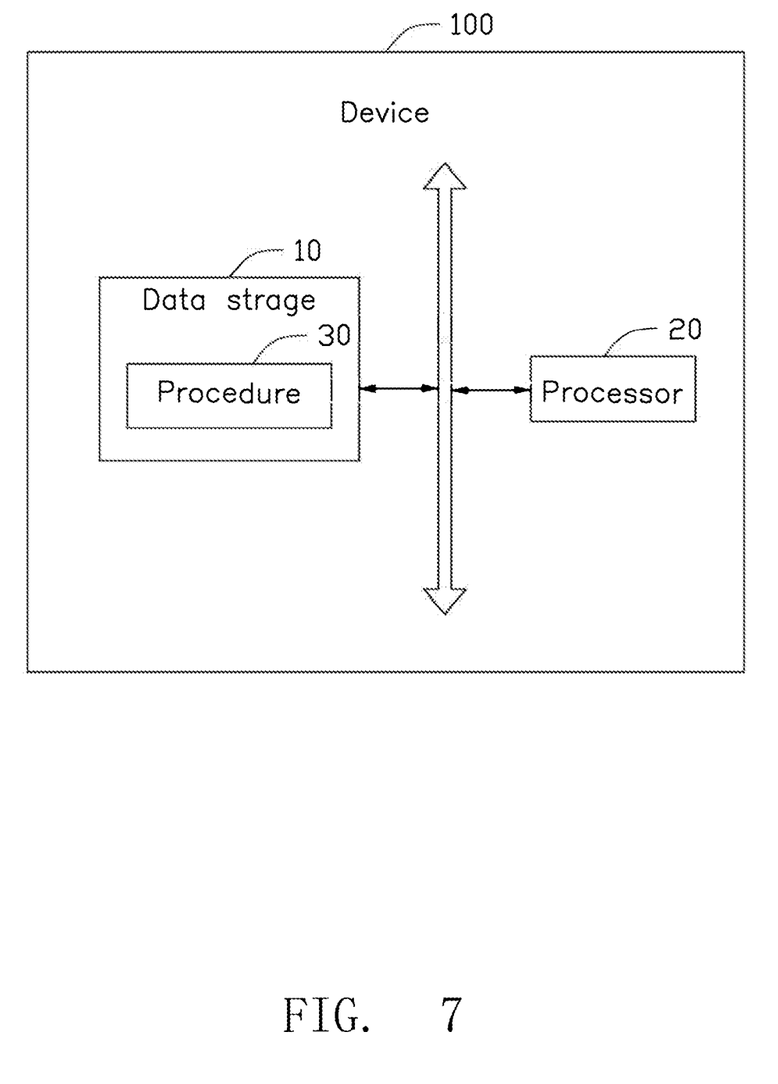
FIG. 7 is a diagram of an embodiment of a device for image reconstruction according to the present disclosure.

FIG. 7 illustrates one embodiment of a device (device 100) for image reconstructing. The device 100 can comprise at least one data storage 10, at least one processor 20, and a procedure for image reconstructing (procedure 30). The procedure 30 may comprise a plurality of computer codes, the computer codes may include commands that can be executed by the processor 20.

In one embodiment, the device 100 can be a computer, a server, or the like. The device 100 can further comprise an interactive device, a display device, a network access device, and communication buses.

In one embodiment, the data storage 10 can be in the device 100, or can be a separate external memory card, such as an SM card (Smart Media Card), an SD card (Secure Digital Card), or the like. The data storage 10 can include various types of non-transitory computer-readable storage mediums. For example, the data storage 10 can be an internal storage system, such as a flash memory, a random access memory (RAM) for temporary storage of information, and/or a read-only memory (ROM) for permanent storage of information. The data storage 10 can also be an external storage system, such as a hard disk, a storage card, or a data storage medium. The processor 20 can be a central processing unit (CPU), a microprocessor, or other data processor chip that performs functions of the device 100.

In one embodiment, the procedure 30 can comprise a plurality of modules, such as the first obtaining module 71, the extracting module 72, the second obtaining module 73, the determining module 74, the calculating module 75, and the correcting module 76.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. An image reconstruction method, comprising:
    obtaining an object image and a reference image, wherein the object image comprises a plurality of first pixels and the reference image comprises a plurality of second pixels;
    extracting a first edge of the object image and a second edge of the reference image based on a predetermined algorithm;
    obtaining a first vector of the plurality of first pixels to the first edge and a second vector of the plurality of second pixels to the second edge;
    determining whether the first vector and the second vector are consistent;
    calculating a loss between the first vector and the second vector if the first vector and the second vector are not consistent; and
    correcting a predetermined model based on the loss and reconstructing the reference image into the object image based on a corrected predetermined model.

2. The image reconstruction method of claim 1, further comprising:
    determining the second pixels are correct pixels if the first vector and the second vector are consistent.

3. The image reconstruction method of claim 1, wherein calculating the loss between the first vector and the second vector comprises:
    calculating the loss between the first vector and the second vector based on a predetermined formula, wherein the predetermined formula is $\Sigma_{n=0}^{N}|V_{target} - V_{reference}|$, $V_{target}$ represents the first vector, $V_{reference}$ represents the second vector, N represents the number of the first pixels and the number of the second pixels.

4. The image reconstruction method of claim 1, further comprising:
    obtaining a training set for the predetermined model, wherein the training set comprises multiple sets of training data, each of the multiple sets of training data comprises three sample images, the three sample images comprises a first object image, a first reference image, and a second reference image;
    inputting each of the multiple sets of training data to the predetermined model and extracting depth information of the first object image based on the predetermined model;
    reconstructing the first reference image into a second object image and the second reference image into a third object image based on the depth information of the first object image;
    obtaining a first difference value between the second object image and the first object image, and obtaining a second difference value between the third object image and the first object image;
    calculating an average difference value of the first difference value and the second difference value; and
    defining the average difference as a training loss of the predetermined model, to iteratively train the predetermined model until the training loss converges, to complete the training of the predetermined model.

5. The image reconstruction method of claim 4, wherein the three sample images are arranged in order, and the first object image is the middle image of the three sample images.

6. The image reconstruction method of claim 1, wherein reconstructing the reference image into the object image based on the corrected predetermined model comprises:
    inputting the object image to the corrected predetermined model to obtain depth information of the object image; and
    reconstructing the reference image into the object image based on the depth information of the object image.

7. The image reconstruction method of claim 1, wherein the predetermined algorithm comprises a Sobel algorithm or a Canny algorithm.

8. An image reconstruction device, comprising:
    at least one processor; and
    a data storage storing one or more programs which when executed by the at least one processor, cause the at least one processor to:
    obtain an object image and a reference image, wherein the object image comprises a plurality of first pixels and the reference image comprises a plurality of second pixels;
    extract a first edge of the object image and a second edge of the reference image based on a predetermined algorithm;
    obtain a first vector of the plurality of first pixels to the first edge and a second vector of the plurality of second pixels to the second edge;

determine whether the first vector and the second vector are consistent;

calculate a loss between the first vector and the second vector if the first vector and the second vector are not consistent; and correct a predetermined model based on the loss and reconstructing the reference image into the object image based on a corrected predetermined model.

9. The image reconstruction device of claim 8, wherein the at least one processor is further configured to:

determine the second pixels are correct pixels if the first vector and the second vector are consistent.

10. The image reconstruction device of claim 8, wherein the at least one processor calculating the loss between the first vector and the second vector comprises:

calculating the loss between the first vector and the second vector based on a predetermined formula, wherein the predetermined formula is $\Sigma_{n=0}^{N}|v_{target}-v_{reference}|$, $V_{target}$ represents the first vector, $V_{reference}$ represents the second vector, N represents the number of the first pixels and the number of the second pixels.

11. The image reconstruction device of claim 8, wherein the at least one processor is further configured to:

obtain a training set for the predetermined model, wherein the training set comprises multiple sets of training data, each of the multiple sets of training data comprises three sample images, the three sample images comprises a first object image, a first reference image, and a second reference image;

input each of the multiple sets of training data to the predetermined model and extract depth information of the first object image based on the predetermined model;

reconstruct the first reference image into a second object image and the second reference image into a third object image based on the depth information of the first object image;

obtain a first difference value between the second object image and the first object image, and obtain a second difference value between the third object image and the first object image;

calculate an average difference value of the first difference value and the second difference value; and define the average difference as a training loss of the predetermined model, to iteratively train the predetermined model until the training loss converges, to complete the training of the predetermined model.

12. The image reconstruction device of claim 11, wherein the three sample images are arranged in order, and the first object image is the middle image of the three sample images.

13. The image reconstruction device of claim 8, wherein the at least one processor reconstructing the reference image into the object image based on the corrected predetermined model comprises:

inputting the object image to the corrected predetermined model to obtain depth information of the object image; and reconstructing the reference image into the object image based on the depth information of the object image.

14. The image reconstruction device of claim 8, wherein the predetermined algorithm comprises a Sobel algorithm or a Canny algorithm.

15. A non-transitory storage medium having stored thereon instructions that, when executed by a processor of an electronic device, causes the electronic device to perform an image reconstruction method, the image reconstruction method comprising:

obtaining an object image and a reference image, wherein the object image comprises a plurality of first pixels and the reference image comprises a plurality of second pixels;

extracting a first edge of the object image and a second edge of the reference image based on a predetermined algorithm;

obtaining a first vector of the plurality of first pixels to the first edge and a second vector of the plurality of second pixels to the second edge;

determining whether the first vector and the second vector are consistent;

calculating a loss between the first vector and the second vector if the first vector and the second vector are not consistent; and correcting a predetermined model based on the loss and reconstructing the reference image into the object image based on a corrected predetermined model.

* * * * *